(No Model.)
G. WORTHINGTON & E. J. PARVIN.
FIBER MACHINE.
No. 304,681. Patented Sept. 2, 1884.
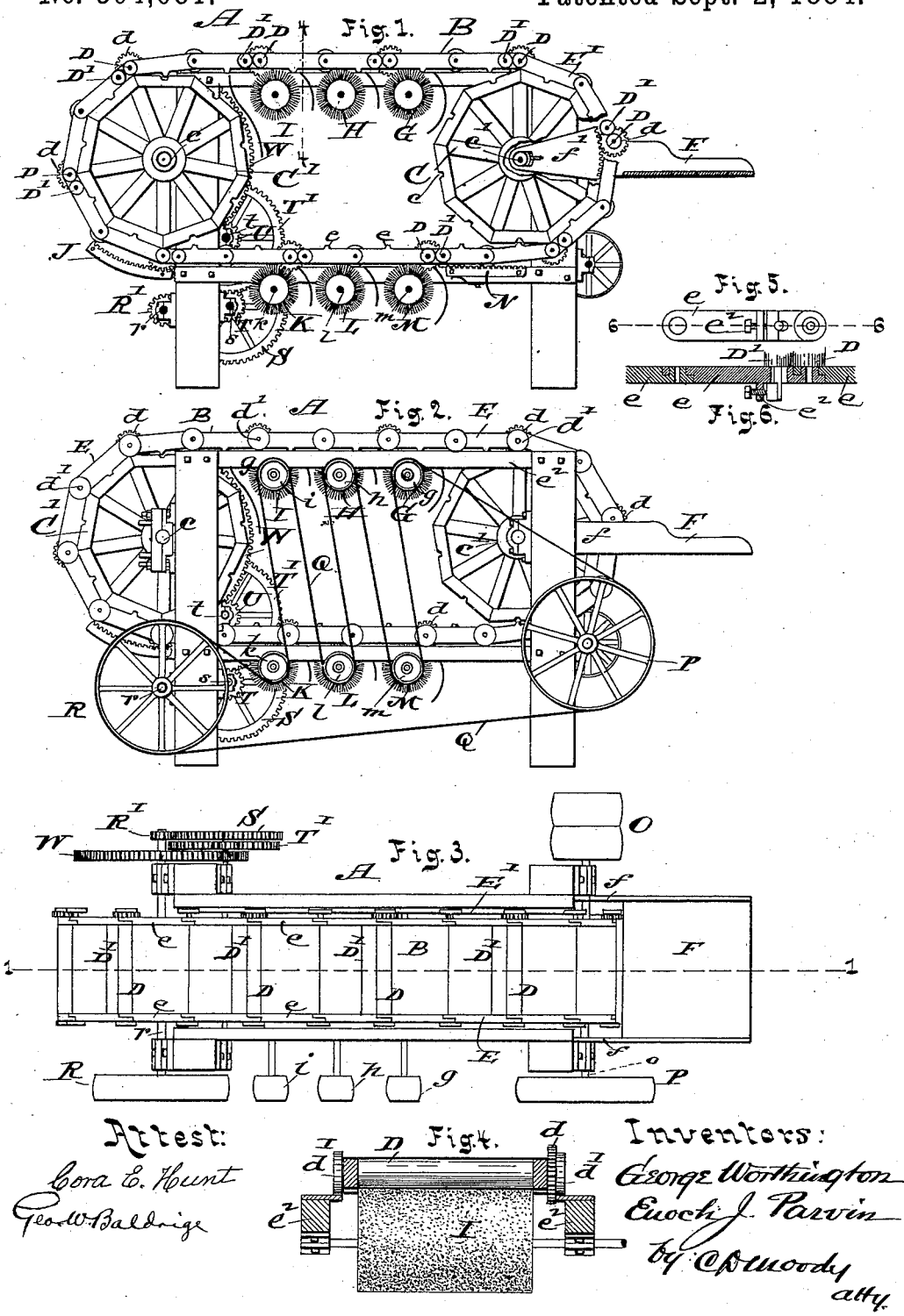

UNITED STATES PATENT OFFICE.

GEORGE WORTHINGTON, OF PITTSFIELD, ILLINOIS, AND ENOCH J. PARVIN, OF McKINNEY, TEXAS.

FIBER-MACHINE.

SPECIFICATION forming part of Letters Patent No. 304,681, dated September 2, 1884.

Application filed April 2, 1884. (No model.)

*To all whom it may concern:*

Be it known that we, GEORGE WORTHINGTON and ENOCH J. PARVIN, residents, respectively, of Pittsfield, Pike county, Illinois, and McKinney, Collin county, Texas, have jointly made a new and useful Improvement in Fiber-Machines, of which the following is a full, clear, and exact description, reference being had to the annexed drawings, making part of this specification, in which—

Figure 1 is a vertical longitudinal section of the improved machine, the section being on the line 1 1 of Fig. 3; Fig. 2, a side elevation of the machine; Fig. 3, a top view of the machine; Fig. 4, a cross-section upon an enlarged scale, on the line 4 4 of Fig. 1; Fig. 5, a detail upon an enlarged scale, being a side elevation of a portion of the endless chain; and Fig. 6, a section on the line 6 6 of Fig. 5.

The same letters of reference denote the same parts.

We have heretofore made an improvement in machines for separating the fiber of plants such as are common in Mexico, the improvement, in a general way, consisting of a frame adapted to be rotated, and provided with a series of pairs of rolls which are carried around with the frame, the stalks or leaves from which the fiber is obtained being fed into the machine, so as to be received at one end between a pair of the series of rolls, and after being thus introduced the stalks or leaves are carried around with the frame, and in their movement subjected to the action of combing and brushing devices, which serve to separate the fiber and to clean it, after which the fiber is discharged by itself from the machine.

The present invention is a modification of the construction referred to, the modification consisting, mainly, in this: In place of a circular frame carrying a series of pairs of rolls, as in the former construction, an endless series of pairs of rolls is employed, the series being carried around a pair of wheels or other bearings adapted to be rotated and to support and move the series, substantially as set forth in the annexed drawings.

A represents the modified machine.

B represents the series of pairs of rolls, and C C' represent the two wheels around which the endless series of rolls is carried.

D D', D D', &c., represent the various pairs of rolls for receiving and carrying the leaves or stalks. They are journaled in a pair of endless chains, E E', the chains passing around the wheels C C'. The wheels are made upon the principle of the sprocket-wheel, in order to insure the positive movement of the chains, and to that end the wheels are notched at $c\ c$, and the links $e\ e$ of the chains are provided with projections $e'$, which are adapted to engage in the notches $c\ c$ as the wheels are rotated.

The leaves or stalks are fed into the machine so as to enter any one of the various pairs of rolls in any suitable manner, and preferably as follows: F represents a table provided with arms $f\ f$, which are extended and are journaled to the shaft $c'$ of the wheel C. The operator feeds the stalks or leaves endwise from the table into a pair of the rolls. To facilitate this part of the operation the table F, as in the construction above referred to, is adapted to be turned upward and downward upon the shaft $c'$, and thereby, as the leaves or stalks are being fed into the rolls, be kept for the time being opposite that pair of rolls into which the stalks or leaves are being fed, after which the table drops back again into its horizontal position, as shown in Figs. 1, 2. Any suitable means can be employed for this purpose, and preferably the means shown in the construction above referred to. In entering the leaves or stalks into the machine they are fed nearly through the pair of rolls which receives them, and in this manner are carried upward and along in the direction of the arrow, Fig. 1, toward the farther wheel C'. As the leaves or stalks are thus carried along, the principal portion of the leaf or stalk will hang down below the (then) upper portion of the series of rolls, and will be brought against the series of brushes G H I, Figs. 1, 2. These brushes are suitably constructed to separate the fiber from the remaining portion of the leaf or stalk, and also to clean the fiber after being separated. To this end the first brush, G, is suitably constructed to penetrate the leaf or stalk, somewhat after the manner of a comb, and thereby separate and disentangle the fiber from the pulpy portion of the leaf or stalk, after which the fiber, as it still hangs in the rolls, is brought under the action of the brushes H I, which serve to separate the fiber still more effectually, and to brush and clean it, and for this purpose the brush I may be made finer than the brush H. After one end of the leaves or stalks has thus been treated, provision is made for moving the stalks or leaves through the rolls, so as to bring the other end into position to be treated, and as follows: The movement of the series of rolls in the direction indicated causes the pair of rolls carrying the leaves or stalks to be carried around the wheel C until the pair of rolls in question has come over the rack J, Figs. 1, 2. One, D, of each pair of rolls has upon its shaft a pinion, $d$, which engages with the rack J as the rolls come opposite it, and by reason of such engagement the rolls are caused to rotate, and by reason of such rotation the leaves or stalks are drawn back through the pair of rolls in which they have been held, and so as to cause the other end of the stalks or leaves to fall below the (now) lower portion of the series of rolls, and in this last-named position to come under the action of the series of brushes K L M, Figs. 1, 2. These last-named brushes, like the brushes first above named, are caused to rotate, and are also of similar nature, the first brush, K, being of a coarser nature and more like a comb, and acting to separate the fiber from the pulpy portion of the stalk or leaf, and the remaining brushes L and M acting to still more effectually separate the fiber and afterward to clean it. The pulpy portion of the stalks or plants has now been separated and has been allowed to drop out of the machine. The fiber alone remains held in the pair of rolls. To discharge it therefrom and from the machine, another rack, N, Fig. 1, is employed to cause the pinion $d$ to rotate still farther and sufficiently to discharge the fiber entirely from the rolls and downward therefrom onto the ground, or into any suitable receptacle provided for the fiber. The pair of rolls then continues on in the movement of the series until it has come opposite the table F again. In this last-named position the pinion $d$ engages with the segment $f'$, and in consequence thereof the rolls are turned so as to cause another lot of stalks or fibers to be fed into the rolls in the manner as first above stated, and so on, as each pair of rolls comes opposite the table F a lot of the leaves or stalks is fed thereinto and carried along around with the series of rolls, to be treated as in the manner described; and in this manner each pair of rolls throughout the series can be made to receive and carry the stalks and fiber, and the entire series may be simultaneously employed in effecting the various stages of the operation of receiving the stalks or leaves, separating and cleaning the fiber, and then discharging it from the machine. Power is communicated to the machine by means of the pulleys O upon the shaft $o$. Upon the other end of the shaft is a pulley, P.

A belt, Q, transmits the motion of the pulley P to the pulley $g\ h\ i\ k\ l\ m$ of the brushes G H I K L M, respectively, and also to the pulley R upon the counter-shaft $r$. This last-named shaft is provided with a pinion, R', Fig. 1, which engages with the gear S upon the shaft $s$. This last-named shaft also has a pinion, T, Fig. 1, which engages with the gear T' on the shaft $t$. The shaft $t$ has also upon it the pinion U, which engages with the gear W upon the shaft $c$ of the wheel C'. In this manner the motion of the pulley R is imparted to the wheel C', and thence to the endless series of rolls D D'. The series is adapted to move over the ways $E^2\ E^2$, and to facilitate the movement the series is provided with the rollers $d'\ d'$. The roll D' can be adjusted toward and from the roll D by means of the adjusting-screws $e^2\ e^2$, Figs. 5, 6.

We claim—

1. In a fiber-machine, the endless series of pairs of rolls, as described.

2. In a fiber-machine, an endless series of pairs of rolls, said series being carried around a pair of bearings adapted to be rotated and to support the series in its movement.

3. In a fiber-machine, an endless series of pairs of rolls, said series being carried around a pair of bearings adapted to be rotated and to support and move the series.

4. The combination of the series B of pairs of rolls D D', &c., and the wheels C C'.

5. The combination of the series B of pairs of rolls D D', &c., the wheels C C', and the table F.

6. The combination of the series B of pairs of rolls D D', &c., the wheels C C', and the table F, said table being adapted to be turned upward and downward, for the purpose described.

7. In a fiber-machine, the combination of the movable endless series B of pairs of rolls with devices—such as the brushes G, &c.—for separating the fiber from the leaves, &c., carried in the rolls.

8. The combination of the endless series of pairs of rolls D D', &c., the pinions $d\ d$, the wheels C C', and the racks $f'$, J, and N.

9. The combination of the endless series of pairs of rolls D D', &c., the pinions $d\ d$, and the rack $f'$.

10. The combination of the endless series of pairs of rolls D D', &c., the pinions $d\ d$, and the rack N.

11. The combination of the endless series of pairs of rolls D D', &c., the pinions $d\ d$, and the rack J, as described.

12. The combination, as described, of the endless series B, the wheels C C', the pinions $d\ d$, the racks $f'$ J N, and the brushes G, &c., and K, &c.

Witness our hands this 15th March, 1884.

GEO. WORTHINGTON.
ENOCH J. PARVIN.

Witnesses:
CHARLES D. MOODY,
CORA E. HUNT.